(12) United States Patent
Biazetti et al.

(10) Patent No.: US 8,589,949 B2
(45) Date of Patent: Nov. 19, 2013

(54) PROCESSING MULTIPLE HETEROGENEOUS EVENT TYPES IN A COMPLEX EVENT PROCESSING ENGINE

(75) Inventors: Ana Claudia Biazetti, Cary, NC (US); Adam Barrett Darney, Cary, NC (US); Edward Joseph Dobner, Raleigh, NC (US); Metin Feridun, Thalwil (CH); Kimberly Lynn Gajda, Raleigh, NC (US); Thomas Gschwind, Zurich (CH); Michael Moser, Zurich (CH); Brian David Pate, Apex, NC (US); Mack Edward Phelps, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1878 days.

(21) Appl. No.: 11/308,768

(22) Filed: May 1, 2006

(65) Prior Publication Data
US 2007/0255529 A1    Nov. 1, 2007

(51) Int. Cl.
*G06F 9/54* (2006.01)
(52) U.S. Cl.
USPC ............... 719/318; 709/223; 709/226

(58) Field of Classification Search
None
See application file for complete search history.

(56) References Cited

U.S. PATENT DOCUMENTS

| | | | |
|---|---|---|---|
| 6,138,121 A | 10/2000 | Costa et al. | |
| 6,145,009 A | 11/2000 | Miyazawa et al. | |
| 6,253,367 B1 | 6/2001 | Tran et al. | |
| 6,549,956 B1 | 4/2003 | Bass et al. | |
| 2002/0010804 A1 | 1/2002 | Sanghvi et al. | |
| 2002/0120734 A1* | 8/2002 | Riosa et al. | 709/224 |
| 2004/0073566 A1 | 4/2004 | Trivedi | |
| 2005/0096966 A1* | 5/2005 | Adi et al. | 705/10 |
| 2005/0160134 A1 | 7/2005 | Childress et al. | |

* cited by examiner

*Primary Examiner* — H S Sough
*Assistant Examiner* — Kimberly Jordan
(74) *Attorney, Agent, or Firm* — Lee Law, PLLC; Christopher B. Lee

(57) ABSTRACT

An invention is disclosed for improved computer system management by allowing complex computer-monitored events to be handled in different formats for correlation, analysis and action. Specifically, a method and system are disclosed for processing multiple heterogeneous event types in a complex event processing (CEP) engine.

20 Claims, 4 Drawing Sheets

PROCESSING MULTIPLE HETEROGENEOUS EVENT TYPES IN A COMPLEX EVENT PROCESSING ENGINE

TECHNICAL FIELD

This invention relates generally to computer system management, and in particular to an improved means for handling complex computer-monitored events by allowing them to be expressed in different formats for correlation, analysis and action. Specifically, a method and system are disclosed for processing multiple heterogeneous event types in a complex event processing (CEP) engine by permitting it to access and/or manipulate events having different formats in order to perform correlations between them that can be acted upon to produce a desired result.

BACKGROUND

Currently, many network data processing systems employ correlation and automation solutions to aid in acting within complex environments, conditions and situations. These solutions are employed to consolidate, correlate and analyze information arising from computer-monitored user or system activities (or "events") occurring within or across network systems to quickly and accurately identify and take action in response to a condition or problem. Processes or actions may be taken to adjust, fix, reconfigure or provision resources to solve the problem when the cause is determined. These correlation and automation solutions are also referred to as complex event processing (CEP) solutions.

Complex event processing (CEP) is the derivation of high-level events from the analysis, correlation, and summarization of low-level events in event-driven systems. These high-level events (called "complex events") are suitable for notifying people of conditions, opportunities or problems in easy-to-understand terms (or for triggering automated processes) so that action can be taken to produce a desired result. The term "event-driven architecture" refers to any applications that react intelligently to changes in conditions, such as the impending failure of a hard drive or a sudden change in stock price. One of the emerging styles of service interactions is the event-driven style. Event-Driven Architecture (EDA) is emerging as a variant of Service Oriented Architecture (SOA) that is being supported by multiple vendors. EDA systems are widely used in enterprise integration applications; including for example time-critical systems, agile process integration systems, managements of services and processes, delivery of information services, and awareness to business situations. There is a range of event processing middleware capabilities (i.e., software that mediates between an application program and a network); including publish-subscribe services (which have been incorporated into standards such as JMS—Java Message Service), commercial systems, mediation services (such as event transformation, aggregation, split and composition) and event pattern detection (complex event processing). The CEP software program must be prepared to respond to a variety of events in unpredictable sequences and combinations.

In a CEP environment there are many different applications that produce and/or utilize "events". Each application that either generates or acts upon events may require a different "event format" for specifying and organizing the characteristics and properties (or "attributes") of the data and instructions (such as their types, sequences and relationships, etc.) that are utilized in processing the event. Applications that must process events from multiple sources, such as a CEP software component (or "engine"), must be capable of accessing and acting upon these different event formats in a standard manner. In addition, the software user or programmer must have access to the "metadata" globally defining the attributes of these events (and their formats), when a graphical user programming interface (GUI) is employed to build operational rules (or "artifacts") that enable the CEP engine to act upon the events. Usually multiple event types with different associated attributes exist within each format that all must be easily accessible using the GUI, so the user can select those attributes of a given event and define logical expressions upon this event to determine if it should be selected by the CEP "rules" in producing a desired result.

Existing programming solutions, such as those described in U.S. Pat. Nos. 6,549,956; 6,253,367; 6,145,009 & 6,138,121 and in U.S. Patent Publication Nos. 2005/0160134; 2004/0073566 & 2002/0010804 (the disclosures of which are all incorporated by reference as if fully set forth herein), either require all events to be converted to a common format or do not permit different event formats to be processed by the same CEP engine. In the first instance, there is a disadvantage in requiring the program user to translate (or "map") the original format to the common format. A degradation in system processing performance also occurs when converting all of the attributes of the original event to the common format. In the second instance, important "cross-correlation" features existing between different events may be lost for those event formats that cannot be processed.

SUMMARY OF THE INVENTION

This invention discloses an improved means for handling complex computer-monitored events in system management, by allowing the events to be expressed in different formats for correlation, analysis and action. Specifically, a method and system are disclosed for processing multiple heterogeneous event types in a complex event processing (CEP) engine by permitting it to access and/or manipulate lower-level events having different formats, in order to perform correlations between them that can be acted upon to generate a higher-level event or otherwise produce a desired result. In this way, the invention improves system performance by handling heterogeneous complex events through their real-time utilization which only occurs during actual system processing of an event.

The invention consists of a CEP engine comprised of a "runtime event wrapper" component for capturing the original event format, along with an "event definition provider" component for handling the "metadata" defining the attributes of that event format and any specific event types associated to it when the rules are being authored. The "runtime event wrapper" component is used to access the original event attributes in a uniform manner, by capturing (or "wrapping") an event in its original format instead of requiring conversion of its attributes to a common format. The "event definition provider" component is used to represent the metadata for an event format and its specific event types in terms of its set of attributes and associated constraints, in order to allow flexible and easy "rule building" capability in selecting those attributes of a given event (and defining logical expressions upon this event) to determine if it should be selected by a given rule. These logical expressions are used to create "CEP rules" that act upon different events expressed in different formats to produce a desired result, when common attributes (as defined by the rules) are encountered in processing the events.

It is therefore an object of the present invention to overcome the disadvantages of the prior art by providing an improved means for handling complex computer-monitored events in system management, using complex event processing (CEP) correlation rules acting upon different events expressed in different formats to produce a desired result when common attributes defined by the rules are encountered as an event is processed.

It is another object of the present invention to overcome the disadvantages of the prior art by providing a method and system for processing multiple heterogeneous event types, using a complex event processing (CEP) engine to access and/or manipulate lower-level events having different formats in performing correlations between events that may generate a higher-level event to produce a desired result.

It is another object of the present invention to overcome the disadvantages of the prior art by providing a complex event processing (CEP) engine comprised of a "runtime event wrapper" component for capturing the original format of an event, used in cooperation with an "event definition provider" component for handling "metadata" defining the attributes of event types in a specific event format at rule authoring time.

It is another object of the present invention to overcome the disadvantages of the prior art by providing a complex event processing (CEP) engine "runtime event wrapper" component used to access original event attributes by capturing an event in its original format instead of converting event attributes to a common format.

It is another object of the present invention to overcome the disadvantages of the prior art by providing a complex event processing (CEP) "event definition provider" component used to represent metadata for an event format and event types in terms of a preferred set of attributes and associated constraints for an event format and its event types, so as to select attributes that form the logical expressions that are part of the CEP rules.

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings.

BRIEF DESCRIPTION OF THE DETAILED DRAWINGS

DETAILED DESCRIPTION OF THE PREFERRED EMBODIMENTS

Figure 1:
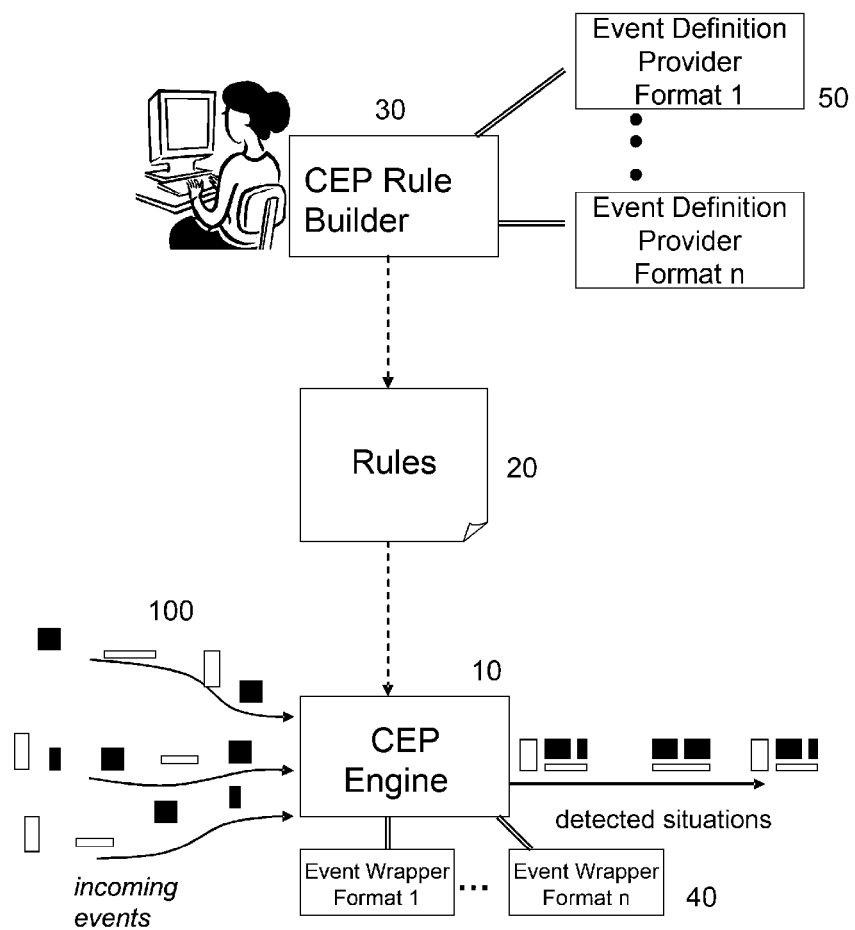
FIGS. 1 & 4 are flowcharts illustrating the complex event processing (CEP) environment where the invention is applied.
Figure 4:
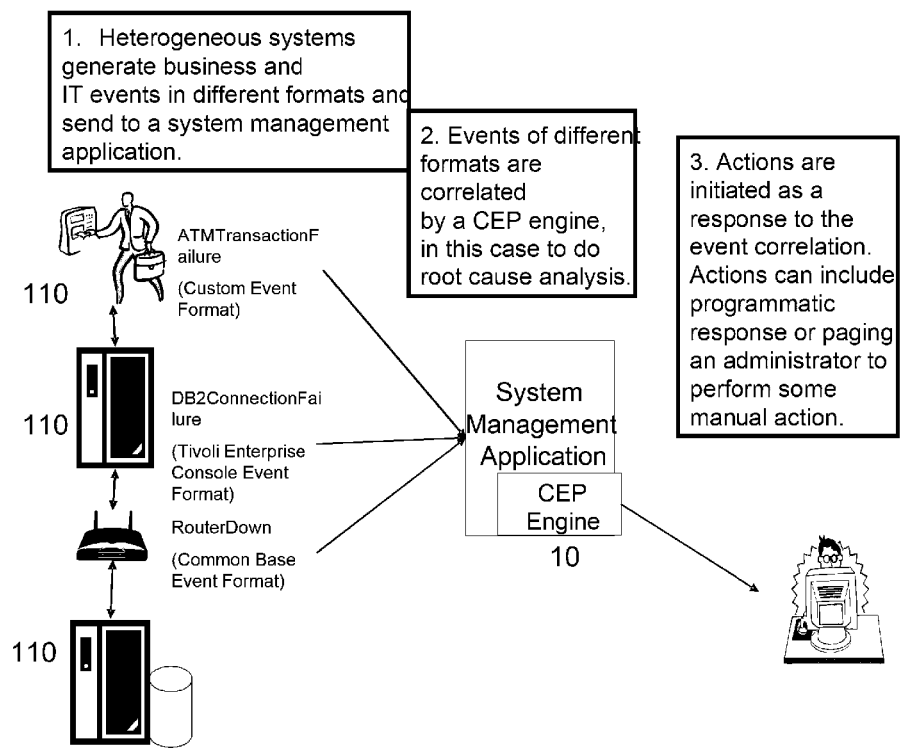

FIGS. 1 & 4 are flowcharts that illustrate the complex event processing (CEP) environment where the invention is applied. It includes a graphical user interface (GUI) CEP Rule Builder 30 that can be employed with the invention to build (or edit) "correlation rules" 20 that enable a complex event processing (CEP) engine 10 to process multiple heterogeneous events 100 in a complex event environment. Each of the computer system management application products that utilize (or "embed") the illustrated CEP environment may require that the CEP engine 10 accept a different event format 110 for processing. (Examples of known formats include: events that conform to the Common Base Event Specification, Financial Market Messages, Symptoms, Situations, SNMP traps, etc.) In addition, some system management products may require the CEP engine 10 to perform correlations between events of different formats. For this reason, the CEP engine 10 must provide a means of allowing different event formats 110 to be processed by the correlation rules 20 without requiring changes to the internal program structure and operation of the engine. This is done through the "runtime event wrapper" components 40. The CEP Rule Builder 30 must provide a means for accessing those different event formats 110 to build the correlation rules 20 using the programming interface provided by the "event definition provider" components 50.

Figure 2:
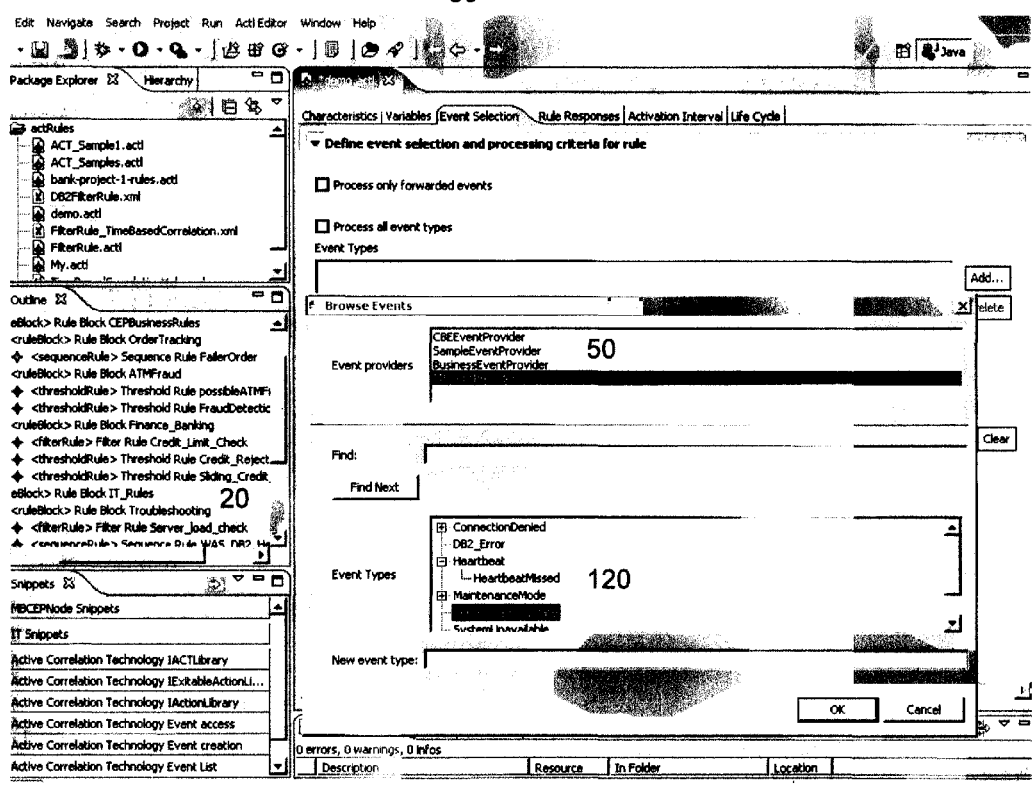
FIGS. 2 & 3 are diagrams illustrating a graphical user interface (GUI) that can be employed with the invention.
Figure 3:
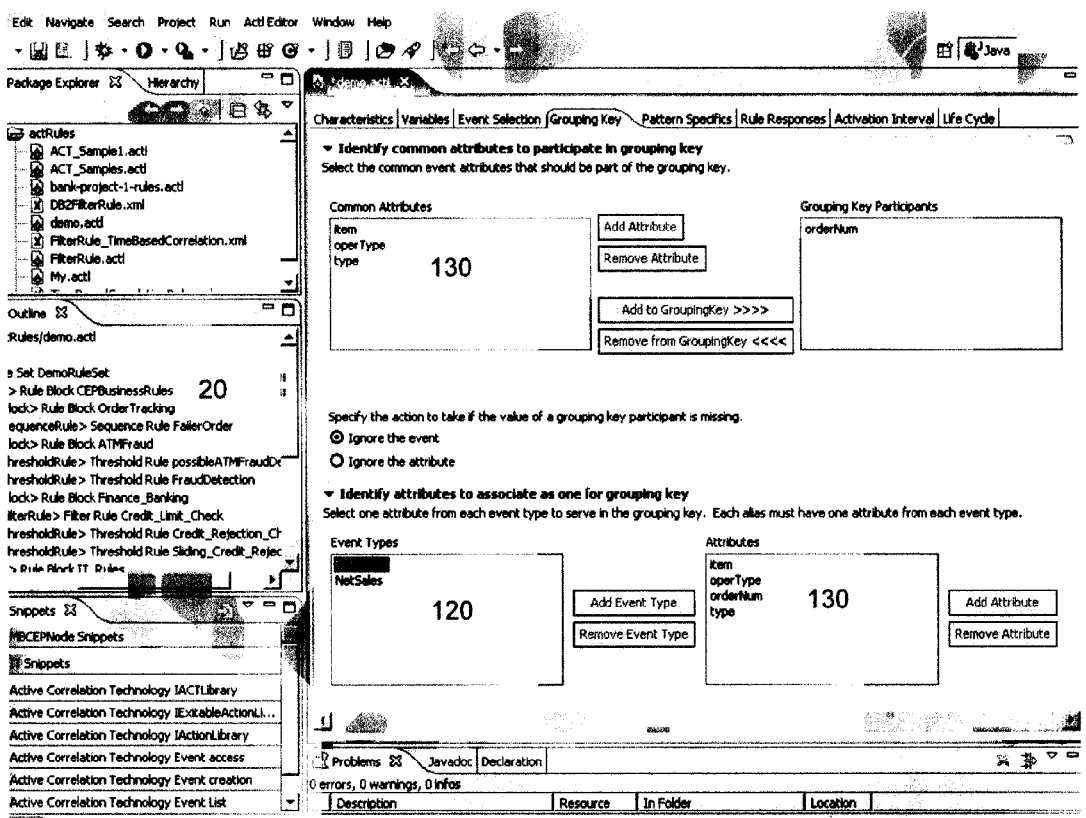

As shown in FIGS. 2 & 3, the CEP Rule Builder 30 is an installable GUI that allows the user (or "rule writer") to select specific event types 120 having different formats 110, in order to specify those of its attributes 130 to be used in forming logical operations that make up the CEP correlation rules 20 used to process events 100. The "event definition provider" interface 50 contains a set of programming techniques (or "methods") that can be implemented or "plugged in" for each event format 110 to enable the CEP Rule Builder 30 to acquire the metadata defining the event types 120 available within each event format. These methods return the event type hierarchy instituted by a given event definition provider 50 as well as detailed information about the attributes 130 that compose a given event type 120. Information about each attribute 130 is displayed (such as its name, type, default values and allowed values) and its location (or "path") is stored for use by the "runtime event wrapper" 40 when a rule 20 utilizing that attribute 130 is being executed and the attribute must be accessed to complete operation of the rule. The attributes 130 can also be organized in a hierarchy that can be visualized in a "tree structure" when shown in the GUI.

The "runtime event wrapper" component 40 of the CEP engine 10 is also a "pluggable" interface that allows the access of the original event format 110 while events are being processed by the rule engine. This interface provides an "abstraction" (i.e., a logical representation) of events 100 that allows them to be processed in a generic fashion. The "runtime event wrapper" 40 contains a set of methods for allowing specific attributes 130 of an event 100 to be retrieved and used in their original form. The "runtime event wrapper" 40 also supports the hierarchical arrangement of complex attributes 130 with a dotted notation that allows a user to access (or "walk") through their different organizational levels. The "runtime event wrapper" 40 also contains a method for allowing the user to access and/or manipulate an event 100 in its original form using the methods available in the underlying implementation of that event.

As shown in FIG. 3, an event provider implements the methods in the "event definition provider" interface 50 in order to provide metadata information about a specific event format 110, including the different event types 120 available within that format (which can be organized in a hierarchy) and the attributes 130 contained by each event type (as well as any constraints on the values those attributes can assume). This metadata information is presented to the rule writer and then used to create CEP correlation rules 20 by selecting those event types 120 (e.g., ServerStatusUpdate) to be used by a rule. Attributes 130 of these event types 120 to be used in logical expressions of the rules (e.g., cpuUsage>0.95) are also selected. These steps are part of the creation of rules 20 that perform correlations between different events 100 expressed in different formats 110.

The CEP engine 10 which processes these rules 20 utilizes the "runtime event wrapper" 40 such that different event types 120 of different formats 110 are correlated with each other to detect common attributes (as defined by the rules 20) when they are encountered. An event 100 maintains its own original format 110 and a specific event attribute 130 is checked by requesting its value from the "runtime event wrapper" 40. In this way, the invention handles heterogeneously formatted complex events "on the fly" to improve system performance through a real-time utilization (or "late binding") of a specific event format which only occurs during "runtime" (or actual system processing of the event).

FIG. 4 provides an example of a CEP "workflow" (or processing sequence) that occurs during runtime. At this stage, the rules 20 (which in this example provide root cause determination between information technology (IT) and business events) are already deployed in the CEP engine 10 (which is embedded in a system management application). Three events (ATMTransactionFailure, DBConnectionFailure and RouterDown) of three different event formats 110 occur in the processing environment and are forwarded to the CEP engine 10, which is capable of handling these different event formats and correlating them together to determine the root cause (in this case, RouterDown). As a result of this action taken by the CEP engine, the operator is alerted to restart the router as a corrective action.

While certain preferred features of the invention have been shown by way of illustration, many modifications and changes can be made that fall within the true spirit of the invention as embodied in the following claims, which are to be interpreted as broadly as the law permits to cover the full scope of the invention, including all equivalents thereto.

What is claimed is:

1. A computer management system comprising:
a memory that stores correlation rules; and
a processor programmed to execute:
  a runtime event wrapper component that comprises a runtime event wrapper method that allows a system operator to access and manipulate sub-system-level events in an original format of the sub-system-level events using methods provided by underlying implementations of the sub-system-level events; and
  a complex event processing engine that:
    receives a plurality of sub-system-level events from a plurality of sub-systems, where each sub-system-level event received from a different one of the plurality of sub-systems comprises a different event type with attributes expressed in a different format;
    retrieves specific attributes associated with each sub-system-level event expressed in the different format;
    processes the specific attributes for each sub-system-level event via correlation rules defined for each different event type that identify common attributes among the attributes expressed in the different format;
    detects the common attributes among the attributes expressed in the different format identified by the correlation rules;
    determines a root cause of the plurality of sub-system-level events based upon the detected common attributes among the attributes expressed in the different format;
    alerts the system operator to perform corrective action associated with the root cause; and
    accesses, to facilitate the corrective action, the runtime event wrapper method of the runtime event wrapper component to access and manipulate at least one of the plurality of sub-system-level events in its original format using at least one method provided by an underlying implementation of the at least one of the plurality of sub-system-level events.

2. The computer management system of claim 1, where:
the runtime event wrapper component further:
  captures an original format of an event;
  receives attribute values associated with the specific attributes associated with each sub-system-level event; and
  processes the received attribute values via the correlation rules; and
the processor is further programmed to execute:
  an event definition provider component that handles metadata defining the attributes of an event type in a specific different format;
where the components are used in cooperation with each other to select attributes that form correlation rules expressing relationships between different events.

3. The computer management system of claim 2, where the event definition provider component represents metadata for an event type in terms of a preferred set of attributes for an event format.

4. The computer management system of claim 2, further comprising a display and where the processor is further programmed to execute a graphical user interface via the display and where the event definition provider component creates the correlation rules through the graphical user interface.

5. The computer management system of claim 1, where the runtime event wrapper component accesses event attributes by capturing an event in its original format instead of converting attributes of different events to a common format.

6. The computer management system of claim 1, where the runtime event wrapper component retrieves and uses specific attributes of an event format in their original form.

7. The computer management system of claim 1, where the runtime event wrapper component supports a hierarchical arrangement of complex attributes with a notation that allows a user to access different hierarchical levels for an event type having a specific format.

8. The computer management system of claim 2, where the event definition provider component returns an event type hierarchy organized in a tree-like structure as well as detailed attribute information about the attributes of a given event type.

9. The computer management system of claim 8, where the detailed attribute information is selected from a group consisting of at least one of an attribute name, an attribute type, at least one attribute default value, at least one attribute allowed value, and an attribute hierarchical path.

10. A method comprising:
using a complex event processing engine to:
  receive a plurality of sub-system-level events from a plurality of sub-systems, where each sub-system-level event received from a different one of the plurality of sub-systems comprises a different event type with attributes expressed in a different format;
  retrieve specific attributes associated with each sub-system-level event expressed in the different format;
  process the specific attributes for each sub-system-level event via correlation rules defined for each different event type that identify common attributes among the attributes expressed in the different format;
  detect the common attributes among the attributes expressed in the different format identified by the correlation rules;

determine a root cause of the plurality of sub-system-level events based upon the detected common attributes among the attributes expressed in the different format; and alert a system operator to perform corrective action associated with the root cause;

using a runtime event wrapper component of the complex event processing engine to capture an original format of an event, where the runtime event wrapper component comprises a runtime event wrapper method that allows the system operator to access and manipulate sub-system-level events in an original format of the sub-system-level events using methods provided by underlying implementations of the sub-system-level events; and using an event definition provider component of the complex event processing engine to handle metadata that defines the attributes of an event type in a specified different format;

where the components are used in cooperation with each other to select attributes that form correlation rules expressing relationships between different events.

11. The method of claim 10, further comprising:
accessing, via the runtime event wrapper component, event attributes by capturing an event in its original format instead of converting attributes of different events to a common format;
receiving attribute values associated with the specific attributes associated with each sub-system-level event; and
processing the received attribute values via the correlation rules.

12. The method of claim 10, further comprising representing, via the event definition provider component, metadata for an event type in terms of a preferred set of attributes for an event format.

13. The method of claim 10, further comprising processing, via the complex event processing engine, multiple heterogeneous event types by at least one of accessing or manipulating lower-level events having different formats to perform correlations between events that generate a higher-level event.

14. The method of claim 13, further comprising dynamically handling, via the complex event processing engine, heterogeneously formatted complex events to improve system performance through a real-time utilization of a specific event format that occurs during system processing of the event.

15. A method, comprising:
receiving, at a complex event processing device, a plurality of sub-system-level events from a plurality of sub-systems, where each sub-system-level event received from a different one of the plurality of sub-systems comprises a different event type with attributes expressed in a different format;
retrieving specific attributes associated with each sub-system-level event expressed in the different format;
processing the specific attributes for each sub-system-level event via correlation rules defined for each different event type that identify common attributes among the attributes expressed in the different format;
detecting the common attributes among the attributes expressed in the different format identified by the correlation rules;
determining a root cause of the plurality of sub-system-level events based upon the detected common attributes among the attributes expressed in the different format;
alerting a system operator to perform corrective action associated with the root cause; and
accessing, to facilitate the corrective action, a runtime event wrapper method of a runtime event wrapper component to access and manipulate at least one of the plurality of sub-system-level events in its original format using at least one method provided by an underlying implementation of the at least one of the plurality of sub-system-level events.

16. The method of claim 15, where retrieving the specific attributes of each sub-system-level event comprises retrieving, via a runtime event wrapper of the runtime event wrapper component associated with each of the plurality of sub-system-level events, the specific attributes of each sub-system-level event via a retrieval method of each runtime event wrapper that allows retrieval of the specific attributes of each sub-system-level event.

17. The method of claim 15, where processing the specific attributes for each sub-system-level event via the correlation rules defined for each different event type that identify the common attributes among the attributes expressed in the different format comprises:
receiving attribute values associated with the specific attributes via a runtime event wrapper of the runtime event wrapper component associated with each sub-system-level event; and
processing the received attribute values via the correlation rules.

18. The method of claim 15, further comprising:
capturing an original event format associated with each of the plurality of sub-system-level events;
where alerting the system operator to perform the corrective action associated with the root cause comprises providing the original event format associated with each of the plurality of sub-system-level events to the system operator.

19. The method of claim 15, where processing the specific attributes for each sub-system-level event via the correlation rules defined for each different event type that identify the common attributes among the attributes expressed in the different format comprises:
receiving metadata that defines the specific attributes and a specific event type of each sub-system-level event; and
selecting a correlation rule for each sub-system-level event based upon the received metadata.

20. The method of claim 19, where selecting the correlation rule for each sub-system-level event based upon the received metadata comprises selecting the correlation rule for each sub-system-level event based upon defined logical expressions associated with each sub-system-level event and each correlation rule.

* * * * *